(12) United States Patent
Bäumchen et al.

(10) Patent No.: US 7,455,336 B2
(45) Date of Patent: Nov. 25, 2008

(54) LOCKING DEVICE FOR A VEHICLE SEAT

(75) Inventors: Carsten Bäumchen, Oberthal (DE); Volker Windecker, Sippersfeld (DE); Thomas Christoffel, Herschweiler-Pettersheim (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 37 days.

(21) Appl. No.: 11/486,873

(22) Filed: Jul. 14, 2006

(65) Prior Publication Data

US 2007/0170341 A1   Jul. 26, 2007

Related U.S. Application Data

(63) Continuation of application No. PCT/EP2004/013700, filed on Dec. 2, 2004.

(30) Foreign Application Priority Data

Jan. 15, 2004   (DE)   .................. 10 2004 002 358

(51) Int. Cl.
*E05C 3/06* (2006.01)
*E05C 3/16* (2006.01)

(52) U.S. Cl. .............. 292/216; 292/DIG. 38; 297/335; 297/336

(58) Field of Classification Search ................ 292/216, 292/DIG. 38; 297/335, 336
See application file for complete search history.

(56) References Cited

U.S. PATENT DOCUMENTS 3,858,916 A * 1/1975 Torii et al. .................... 292/45
3,905,624 A * 9/1975 Fujita .......................... 292/11
4,097,078 A * 6/1978 Tack et al. .................. 292/216
4,270,783 A * 6/1981 Sorensen et al. ......... 292/336.3
4,542,563 A   9/1985 Befort
4,711,493 A   12/1987 Schrom et al.
4,765,682 A   8/1988 Satoh
4,838,588 A * 6/1989 Hayakawa et al. ......... 292/216
5,494,324 A * 2/1996 Kleefeldt ................... 292/340
6,012,747 A * 1/2000 Takamura et al. .......... 292/216
6,547,302 B1 * 4/2003 Rubio et al. .............. 296/65.09
6,641,184 B2 * 11/2003 Erices et al. ............... 292/216
6,715,841 B2 * 4/2004 Christoffel et al. ....... 297/463.1
6,733,078 B1 * 5/2004 Zelmanov ................ 297/378.1
2003/0102709 A1   6/2003 Christoffel et al.
2006/0006673 A1   1/2006 Christoffel et al.
2006/0208505 A1 * 9/2006 Christoffel et al. ......... 292/216

FOREIGN PATENT DOCUMENTS

DE   34 04 508 A1   8/1984
DE   100 57 776 A1   5/2002

(Continued)

*Primary Examiner*—Carlos Lugo
(74) *Attorney, Agent, or Firm*—Womble Carlyle Sandridge & Rice, PLLC

(57) ABSTRACT

In the case of a locking device (1), in particular for a vehicle seat, with a housing (3); a latch (11) which is arranged in the housing (3), is pivotably mounted on a first bearing element (13) and is intended for locking with a mating element (B); and at least one securing element (25, 27) which is likewise arranged in the housing (3), is pivotably mounted on a second bearing element (23) and secures a locked state by interaction with the latch (11), the housing (3) has at least one insert (6) of a higher strength material, and at least one of the bearing elements (13, 23) and the insert (6) are joined together and are at least partially encased by a softer material, forming the housing (3).

23 Claims, 1 Drawing Sheet

FOREIGN PATENT DOCUMENTS

| | | |
|---|---|---|
| DE | 101 15 667 A1 | 10/2002 |
| DE | 102 02 344 A1 | 4/2003 |
| DE | 101 56 200 A1 | 6/2003 |
| DE | 103 05 177 A1 | 8/2004 |
| EP | 1 279 552 A2 | 1/2003 |
| FR | 2 828 148 | 2/2003 |
| FR | 2 828 149 | 2/2003 |
| FR | 2 848 929 | 6/2004 |
| WO | WO 2004/069580 | 8/2004 |
| WO | WO 2005/037596 | 4/2005 |

* cited by examiner

LOCKING DEVICE FOR A VEHICLE SEAT

CROSS-REFERENCE TO RELATED APPLICATION

The present application is a continuation of International Application PCT/EP2004/013700, which was filed Dec. 2, 2004. The entire disclosure of PCT/EP2004/013700 is incorporated herein by reference.

BACKGROUND OF THE INVENTION

The present invention relates to a locking device, in particular for a vehicle seat, with the locking device including a housing; a latch that is arranged in the housing, is pivotably mounted on a first bearing element, and is for locking with a mating element; and at least one securing element that is arranged in the housing, is pivotably mounted on a second bearing element, and secures a locked state by interaction with the latch.

In the case of a known locking device of the type described immediately above, the latch and two securing elements are arranged within a largely closed common metallic housing. The housing is fastened to a structural part of the vehicle seat or of the motor vehicle and is covered by a plastic panel clipped onto the outside of the base plate.

BRIEF SUMMARY OF SOME ASPECTS OF THE INVENTION

The present invention is based on the object of improving a locking device of the type described above. In accordance with one aspect of the present invention, a locking device (e.g., for a vehicle seat) includes a housing including a softer material and at least one insert of a higher strength material. A latch is arranged in the housing, and the latch is pivotably mounted on a first bearing element. The latch is for locking with a mating element. At least one securing element is arranged in the housing and pivotably mounted on a second bearing element. The at least one securing element is for securing a locked state of the locking device by interacting with the latch. The insert and at least one of the bearing elements are joined together and at least partially encased by the softer material.

The housing having at least one insert of a higher strength material, and at least one of the bearing elements and the insert being joined together and at least partially encased by a softer material, forming the housing, can be advantageous. First, high forces can be absorbed and passed on in the event of a crash by the bearing elements and the insert, whereas the use of the softer material generally reduces the weight of the housing and therefore of the entire locking device. Second, the encasing of the load-absorbing components provides a means of securing them during transportation, which ensures an exact relative positioning until they are fastened to a structural part.

While steel is preferably selected as the higher strength material, the softer material is preferably plastic, which in addition to the saving on weight affords the advantage that the housing can be produced in a simple manner even in the case of a more complex structure. To shorten the production process, the bearing element and the insert are preferably joined together in the injection mold and are then encased with the plastic. Apart from this encapsulation of the higher strength material by the softer material, other encasing possibilities are also conceivable, in which there is a fixed, extensive connection between the higher strength material and the softer material, for example coating by dipping the insert part and bearing element into a melt or solution of the softer material.

In order to design the force flux between the bearing element and the insert or vice versa such that it is as favorable as possible and to keep the housing regions of the softer material outside the force flux, the bearing element and the insert preferably interact in an interlocking manner, for example by the bearing element being placed into an opening of the insert and the bearing element preferably being in direct contact with the insert.

In order to avoid separate lubrication of the bearing point of the latch and/or of the securing element, the bearing element is preferably encased by the softer material also on the bearing section serving for the mounting of the latch and/or of the securing element, i.e. the softer material forms the lubricant and ensures compensation of tolerances.

In a preferred embodiment, the housing is designed such that it is half open and a structural part to which the locking device is to be fastened closes the housing. As a result, a separate cover does not have to be provided, which saves material, weight and construction space and, in particular, avoids unnecessary duplications of material. The locking device, which is preferably already functional and testable for normal use and is open towards one side, obtains its full strength, in particular with regard to the loads in the event of a crash, by attachment to the structural part. At the same time, the components within the locking device are protected from damage and soiling by the housing being closed. The fastening to the structural part preferably takes place, for example, by means of screws which, in order to save construction space, are received by the bearing elements which are preferably of hollow design.

In the case of a locking device with an increased locking reliability and increased load-bearing capacity in the event of a crash, a clamping eccentric and an intercepting piece are provided as securing elements. The spring-loaded clamping eccentric acts upon the latch with a closing moment in the locked state, and the intercepting element supports the latch in the event of a crash.

The locking device according to the invention can be used at various points of a vehicle seat, for example for connecting the entire vehicle seat to the floor or as a backrest lock for fastening the backrest to the vehicle structure, with the locking device being attached to a structural part fixed on the seat structure or a structural part fixed on the vehicle structure, and the mating element being correspondingly fixed on the vehicle structure or fixed on the seat structure. The locking device may also be integrated in an articulated fitting which is provided for setting the inclination of the backrest, in particular if one of the fitting parts is to be designed as a hollow box.

Other aspects and advantages of the present invention will become apparent from the following.

BRIEF DESCRIPTION OF THE DRAWINGS

The invention is explained in more detail below with reference to an exemplary embodiment illustrated in the drawings and a modification thereof.

DETAILED DESCRIPTION OF EXEMPLARY EMBODIMENT

Figure 1:
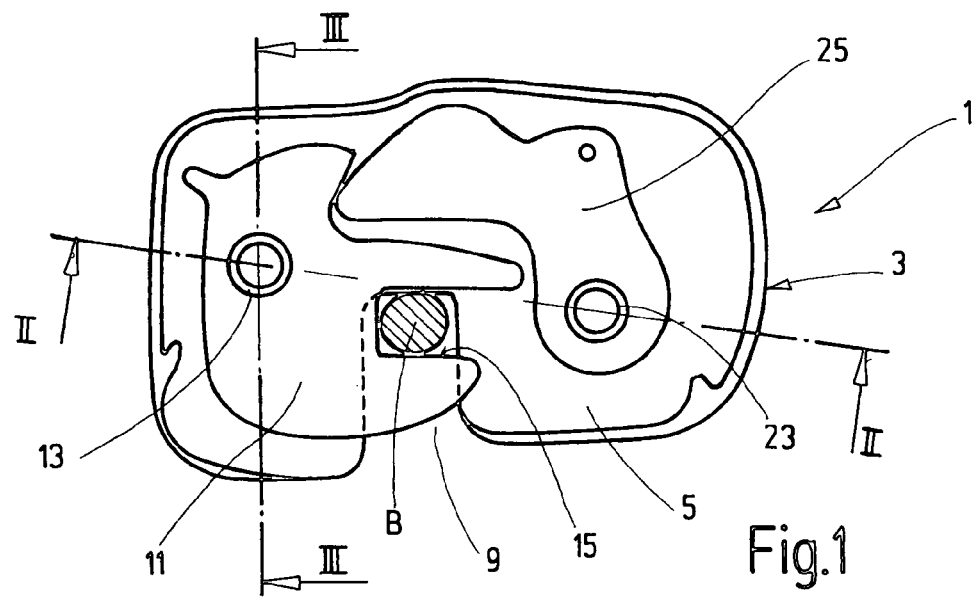
FIG. 1 shows a view of the exemplary embodiment, without showing the springs.
Figure 2:
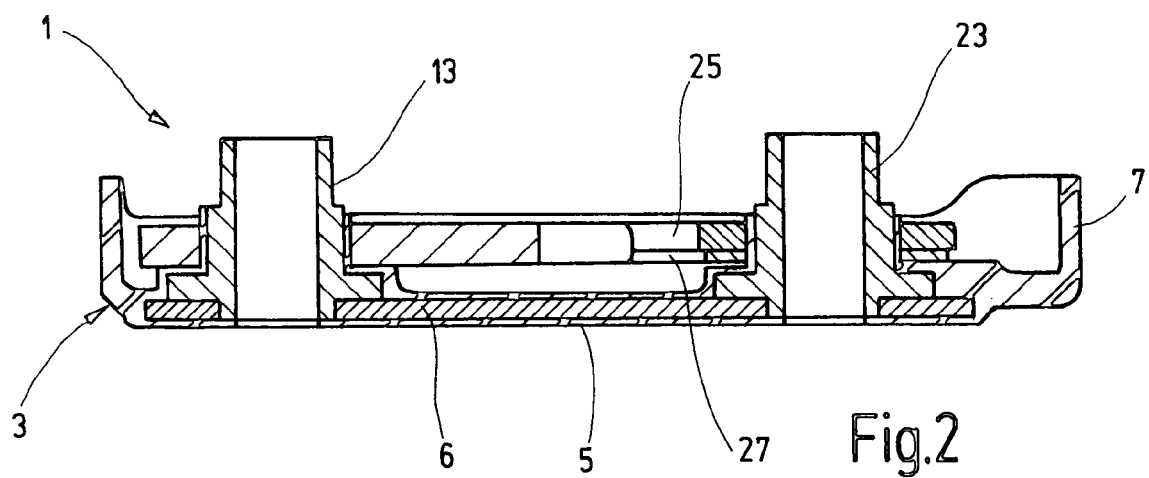
FIG. 2 shows a section along the line II-II in FIG. 1.
Figure 3:
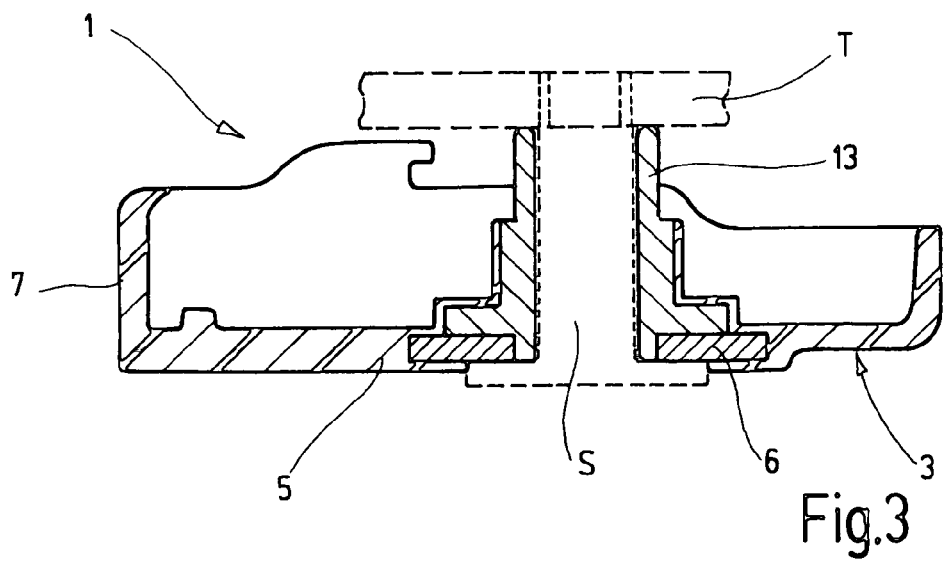
FIG. 3 shows a section along the line III-III in FIG. 1.

A locking device 1 is provided for the releasable connection of a backrest of a vehicle seat to the vehicle structure of a motor vehicle, but the locking device could also be used for connecting a vehicle seat to the floor or as an engine hood or tail gate lock. The locking device 1 has a half-open plastic housing 3 with a base plate 5 which is oriented vertically and in the direction of travel and defines the directional details used below. The base plate 5 is provided with an insert 6 of steel or another material of higher strength than the plastic, which is injected into the base plate 5. The edge regions of the base plate 5 merge integrally into a side wall 7 which protrudes perpendicularly to the base plate 5 and substantially completely surrounds the base plate. A bolt receptacle 9 is formed on one longitudinal side of the housing 3. The bolt receptacle 9 opens outward (e.g., is not obstructed by the side wall 7) and serves to receive a bolt B fixed on the vehicle structure or another mating element. In this case, the width of the bolt receptacle 9 is larger than the diameter of the bolt B, to compensate for tolerances. The mating element may also be a section of a bracket.

A latch 11 is pivotably mounted on a first bearing element 13 which protrudes from the base plate 5 parallel to the side wall 7 and is designed as a stepped, hollow bolt. For interaction with the bolt B, the latch 11 has a hook mouth 15. In a locked state of the locking device 1, the hook mouth 15 at least approximately perpendicularly crosses and closes the bolt receptacle 9. In an open state, the hook mouth 15 opens the bolt receptacle 9. A spring (not illustrated) prestresses (e.g., biases) the latch 11 in the closing direction.

A second bearing element 23 is arranged on the housing 3 at a distance from the first bearing element 13. The second bearing element 23 is in principle designed identically to the first bearing element 13. An intercepting piece 25 is pivotably mounted on the second bearing element 23. The intercepting piece 25 is prestressed (e.g., biased) in the direction of the latch 11 by means of a further spring (likewise not illustrated). A clamping eccentric 27 is mounted on the second bearing element 23 adjacent to the intercepting piece 25. The clamping eccentric 27 is prestressed (e.g., biased) by a third spring (likewise not illustrated) so that the clamping eccentric acts upon the latch 11 in the locked state with a closing moment and, as a result, keeps the latch in engagement with the bolt B.

In the normal case, the intercepting piece 25 is arranged adjacent to the latch 11. In the event of a crash, if the latch 11 experiences an opening moment and pushes away the clamping eccentric 27, the latch 11 comes into contact with the intercepting piece 25 which supports the latch 11 and prevents an opening of the latch. To unlock the locking device 1, the intercepting piece 25 is pivoted away from the latch 11 in a manner known per se, for example via an integrally formed unlocking bolt, a lever or a Bowden cable, with the intercepting piece carrying along the clamping eccentric 27 via an integrally formed driver, if appropriate after a small idle stroke. The latch 11 is then no longer secured, but rather is pulled up and is kept open by the intercepting piece 25 in the unlocked state. The clamping eccentric 27 and the intercepting piece 25 are therefore securing elements for the latch 11 both in the locked and in the open state.

To produce the housing 3, first of all the two bearing elements 13 and 23 and the insert 6 are automatically supplied to the injection mold. Within the injection mold, the two bearing elements 13 and 23 are placed, if appropriate pressed, or fitted in some other way, into suitable openings in the insert 6. These individual parts are then at least partially encased with one or more plastic components which, after solidifying to form the housing 3, ensure an interlocking connection of these individual parts. The force flux between the bearing elements 13 and 23 and the insert 6 takes place directly, so that the plastic regions of the housing 3 primarily satisfy a covering function. Given a suitable selection of material, there is the possibility, by the plastic encasing of the bearing elements 13 and 23 on their bearing sections for the securing elements, to allow these bearing points—and therefore the entire locking device 1—to be free from grease, which greatly reduces the soiling.

With the components described above, the locking device 1 already has its functioning capability for normal use, i.e. forms a testable unit, even if the housing 3 is still open. The locking device 1 is fastened to a structural part T, for example to a backrest strut, by means of screws S which penetrate the bearing elements 13 and 23 (e.g., the bearing elements include openings), so that the structural part T bears on the ends of the bearing elements 13 and 23. Because of this reinforcement of the bearing points and the approximate closing of the housing 3 by the structural part T, the locking device achieves full strength for a crash situation.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A locking device that is capable of locking to a mating element, the locking device comprising:
    a housing including a softer material and at least one insert of a higher strength material, wherein the softer material is softer than the higher strength material, and the higher strength material has a higher strength than the softer material;
    a first bearing element;
    a latch for locking with the mating element, wherein the latch is arranged in the housing, and the latch is pivotably mounted on the first bearing element;
    a second bearing element;
    at least one securing element for securing a locked state of the locking device by interacting with the latch, wherein the at least one securing element is arranged in the housing, the at least one securing element is pivotably mounted on the second bearing element,
    the insert and a bearing element, which is selected from the group consisting of the first bearing element and the second bearing element, are joined together and at least partially encased by the softer material,
    said bearing element includes a bearing section that is encased by the softer material, and
    a feature, which is selected from the group consisting of the latch and the at least one securing element, is pivotably mounted on the encased bearing section of said bearing element the bearing section comprises a flange portion and shaft portions extending from the flange portion; wherein, the insert and the bearing element are joined by inserting one of the shaft portions through an aperture on the insert and placing the flange over the outer surface of the insert.

2. The locking device as claimed in claim 1, wherein the higher strength material is steel.

3. The locking device as claimed in claim 2, wherein the softer material is plastic.

4. The locking device as claimed in claim 2, wherein said bearing element interacts in an interlocking manner with the insert.

5. The locking device as claimed in claim 1, wherein the softer material is plastic.

6. The locking device as claimed in claim 5, wherein the insert and said bearing element being joined together and at least partially encased by the softer material comprises:

the insert and said bearing element being joined together in an injection mold, and then the insert and said bearing element being at least partially encased by the softer material while the insert and said bearing element are joined together in the injection mold.

7. The locking device as claimed in claim 1, wherein said bearing element interacts in an interlocking manner with the insert.

8. The locking device as claimed in claim 1, wherein said bearing element is in direct contact with the insert.

9. The locking device as claimed in claim 1, wherein:
the housing is half open, and
the housing is configured for being fastened to a structural part so that the structural part substantially closes the housing.

10. The locking device as claimed in claim 9, wherein:
said bearing element includes an opening, and
said bearing element is configured for receiving a screw in the opening for fastening the locking device to the structural part.

11. The locking device as claimed in claim 10 in combination with the mating element, the structural part and the screw, wherein:
the housing is fastened to the structural part so that the structural part substantially closes the housing, and
the housing being fastened to the structural part comprises the screw being in the opening of said bearing element.

12. The locking device as claimed in claim 1, wherein:
the at least one securing element comprises a spring-loaded clamping eccentric and an intercepting piece,
the spring-loaded clamping eccentric is for acting upon the latch with a closing moment in a blocked state, and
the intercepting piece is for supporting the latch in the event of a crash.

13. The locking device as claimed in claim 1, wherein:
said bearing element comprises the second bearing element, and
the feature is the at least one securing element, so that the at least one securing element is pivotably mounted on the encased bearing section of the second bearing element.

14. The locking device as claimed in claim 1, wherein:
the insert includes an opening, and
said bearing element is positioned in the opening of the insert.

15. The locking device as claimed in claim 14, wherein:
the softer material is plastic, and
the higher strength material is steel.

16. The locking device as claimed in claim 1, wherein:
said bearing element is the first bearing element, and
the insert and the second bearing element are joined together and at least partially encased by the softer material.

17. A locking device that is capable of locking to a mating element, the locking device comprising:
a housing including a softer material and at least one insert of a higher strength material, wherein the softer material is softer than the higher strength material, and the higher strength material has a higher strength than the softer material;
a first bearing element;
a latch for locking with the mating element, wherein the latch is arranged in the housing, and the latch is pivotably mounted on the first bearing element;
a second bearing element;
at least one securing element for securing a locked state of the locking device by interacting with the latch, wherein
the at least one securing element is arranged in the housing,
the at least one securing element is pivotably mounted on the second bearing element,
the insert and a bearing element, which is selected from the group consisting of the first bearing element and the second bearing element, are joined together and at least partially encased by the softer material,
said bearing element includes a bearing section that is encased by the softer material,
said bearing element comprises the first bearing element, whereby the insert and the first bearing element are joined together and at least partially encased by the softer material, and
the latch is pivotably mounted on the encased bearing section of the first bearing element the bearing section comprises a flange portion and shaft portions extending from the flange portion; wherein, the insert and the bearing element are joined by inserting one of the shaft portions through an aperture on the insert and placing the flange over the outer surface of the insert.

18. A locking device that is capable of locking to a mating element, the locking device comprising:
a housing including
(a) a part that is formed of a softer material, and
(b) at least one insert of a higher strength material, wherein the softer material is softer than the higher strength material, and the higher strength material has a higher strength than the softer material;
a first bearing element;
a latch for locking with the mating element, wherein the latch is arranged in the housing, and the latch is pivotably mounted on the first bearing element;
a second bearing element; and
at least one securing element for securing a locked state of the locking device by interacting with the latch, wherein
the at least one securing element is arranged in the housing,
the at least one securing element is pivotably mounted on the second bearing element,
the insert and a bearing element, which is selected from the group consisting of the first bearing element and the second bearing element, are joined together,
the part, which is formed of the softer material, is formed onto both the insert and said bearing element, so that
(a) the insert is at least partially encased by the softer material of the part of the housing, and
(b) said bearing element is at least partially encased by the softer material of the part of the housing;
said bearing element includes a bearing section;
the part, which is formed of the softer material, is formed onto the bearing section, so that the bearing section is encased by the softer material of the part of the housing, and
a feature, which is selected from the group consisting of the latch and the at least one securing element, is pivotably mounted on the encased bearing section of said bearing element the bearing section comprises a flange portion and shaft portions extending from the flange portion; wherein, the insert and the bearing element are joined by inserting one of the shaft portions through an aperture on the insert and placing the flange over the outer surface of the insert.

19. The locking device as claimed in claim 18, wherein said bearing element interacts in an interlocking manner with the insert.

20. The locking device as claimed in claim 18, wherein said bearing element is in direct contact with the insert.

21. The locking device as claimed in claim 18, wherein the softer material is plastic.

22. The locking device as claimed in claim 21, wherein the part, which is formed from the plastic, is injection-molded onto both the insert and said bearing element, so that each of the insert and said bearing element is at least partially encased by the plastic of the injection-molded part of the housing.

23. The locking device as claimed in claim 22, wherein:
the injection-molded part of the housing is injection-molded onto the bearing section, so that the bearing section is encased by the plastic of the injection-molded part of the housing.

* * * * *